(12) United States Patent
Bonicatto et al.

(10) Patent No.: US 10,516,421 B1
(45) Date of Patent: Dec. 24, 2019

(54) APPARATUSES AND METHODS INVOLVING RADIO CONFIGURABILITY FOR ADAPTING TO RADIO-FREQUENCY SYSTEMS

(71) Applicant: Landis+Gyr Technologies, LLC, Pequot Lakes, MN (US)

(72) Inventors: Damian Bonicatto, Pequot Lakes, MN (US); Stuart Haug, Hackensack, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

(21) Appl. No.: 16/135,971

(22) Filed: Sep. 19, 2018

Related U.S. Application Data

(60) Provisional application No. 62/560,522, filed on Sep. 19, 2017.

(51) Int. Cl.
*H04B 1/00* (2006.01)
*H04B 1/18* (2006.01)

(52) U.S. Cl.
CPC ......... *H04B 1/0021* (2013.01); *H04B 1/0014* (2013.01); *H04B 1/0017* (2013.01); *H04B 1/18* (2013.01)

(58) Field of Classification Search
CPC .. H04B 1/0021; H04B 1/0014; H04B 1/0017; H04B 1/18
See application file for complete search history.

(56) References Cited

U.S. PATENT DOCUMENTS 6,151,571 A 11/2000 Pertrushin
6,246,717 B1 6/2001 Chen et al.
(Continued)

FOREIGN PATENT DOCUMENTS

CN 101351713 A 1/2009
CN 102594346 A 7/2012
(Continued)

OTHER PUBLICATIONS

C. Hearn et al. "Data Acquisition in Wireless Router Link Testbed using GNU Radio Companion GNU Radio Conference (GRCON 2016)." Proceedings of the 6th GNU Radio Conference (2016), 6 pages.

(Continued)

*Primary Examiner* — Curtis B Odom
(74) *Attorney, Agent, or Firm* — Kilpatrick Townsend & Stockton LLP

(57) ABSTRACT

Embodiments in accordance with the present disclosure are directed to communications apparatuses and methods thereof that includes a radio frequency (RF) front-end circuitry and RF back-end circuitry. The RF front-end circuit receives sets of RF signals concurrently and as transmitted from at least two disparate communication networks. The front-end circuitry includes a tunable radio having at least one antenna feeding signal conditioning and down conversion circuitry, and decimation circuitry. The decimation circuitry filters and decimates data associated with the RF signals into a plurality of digital data streams. The RF back-end circuitry includes a plurality of digital-signal processors (DSPs) that extract raw data packets from the digital data streams and a microprocessor. The microprocessor transmits the plurality of digital data streams to the plurality of DSPs and transmits the extracted raw data packets, received from the plurality of DSPs, to an end-user device.

20 Claims, 9 Drawing Sheets

(56) References Cited

U.S. PATENT DOCUMENTS

| | | |
|---|---|---|
| 6,307,896 B1 | 10/2001 | Gumm et al. |
| 6,671,334 B1 | 12/2003 | Kuntz et al. |
| 7,116,943 B2 | 10/2006 | Sugar et al. |
| 7,161,515 B2 | 1/2007 | Slavin |
| 7,171,161 B2 | 1/2007 | Miller |
| 7,184,777 B2 | 2/2007 | Diener et al. |
| 7,315,731 B2 | 1/2008 | Nara |
| 7,539,533 B2 | 5/2009 | Tran |
| 7,558,622 B2 | 7/2009 | Tran |
| 7,733,224 B2 | 6/2010 | Tran |
| 8,737,555 B2 | 5/2014 | Haug et al. |
| 8,923,894 B1 | 12/2014 | Bernard et al. |
| 9,243,975 B2 | 1/2016 | Taylor |
| 9,297,834 B2 | 3/2016 | Dobyns et al. |
| 9,525,462 B1 | 12/2016 | Haug et al. |
| 9,702,907 B2 | 7/2017 | Stanton et al. |
| 2007/0098045 A1 | 5/2007 | Cameron |
| 2008/0037454 A1 | 2/2008 | Werb et al. |
| 2008/0293353 A1 | 11/2008 | Mody et al. |
| 2014/0111184 A1 | 4/2014 | Dalebroux |
| 2014/0241178 A1* | 8/2014 | Seely .................. H04W 24/04 370/252 |

FOREIGN PATENT DOCUMENTS

| | | |
|---|---|---|
| DE | 19964611 B4 | 11/2011 |
| EP | 1884876 A2 | 2/2008 |
| JP | 2012042468 A | 3/2012 |
| JP | 2013127466 A | 6/2013 |
| JP | 2014145757 A | 8/2014 |
| JP | 2015031696 A | 2/2015 |

OTHER PUBLICATIONS

W. Liu et al. "Advanced spectrum sensing with parallel processing based on software-defined radio." EURASIP Journal on Wireless Communications and Networking 2013, 2013:228, 15 pages.

R. Nelson. "5G researchers take aim at moving target." EE—Evaluation Engineering, Feb. 2016, p. 6+. Academic OneFile (Abstract only).

S. Munjuluri et al. "Towards faster spectrum sensing techniques in cognitive radio architectures." Procedia Computer Science 46 ( 2015 ) 1156-1163.

B. Sadhu et al. "Passive Switched Capacitor RF Front Ends for Spectrum Sensing in Cognitive Radios." International Journal of Antennas and Propagation, vol. (2014), Article ID 947373, 20 pages.

P. Roblin et al. "Guest Editorial—Special Issue on Emerging RF Measurement Techniques and Applications." IEEE Transactions on Microwave Theory and Techniques, vol. 64, No. 11, November 2016, pp. 3761-3763.

R. Nelson. "Bench and modular instruments on the radar." EE—Evaluation Engineering, Apr. 2014, p. 19+. Academic OneFile (Abstract only).

L. Angrisani et al. "Optimization and experimental characterization of novel measurement methods for wide-band spectrum sensing in cognitive radio applications." Measurement, vol. 94, Dec. 2016, pp. 585-601 (Abstract only).

A. Wolke. "What's Your IQ—About Quadrature Signals . . . " Tektronix (Jun. 22, 2015) www.tek.com/blog, 10 pages.

T. Schilcher. "RF applications in digital signal processing." CERN 2008, pp. 249-283.

S. Haug et al. U.S. Appl. No. 15/692,984. The Examiner is respectfully referred to this copending patent prosecution of the common Applicant/Assignee. Copy not attached.

* cited by examiner

APPARATUSES AND METHODS INVOLVING RADIO CONFIGURABILITY FOR ADAPTING TO RADIO-FREQUENCY SYSTEMS

OVERVIEW

Aspects of the present disclosure are directed to communications systems involving radio-frequency (RF) receivers that detect and receive RF communications over channels in environments that are noisy and/or crowded. Such environment can be crowded by RF signals of multiple disparate RF communications systems such as cellular and local-area RF networks which commonly transmit data within overlapping frequency ranges using a multitude of modulation schemes.

SUMMARY

Aspects of the present disclosure are directed to addressing the above-discussed aspects as well as others which will become apparent based on the detailed description that follows. According to one embodiments of the present disclosure, aspects are directed to apparatuses (e.g., systems and devices) which are configured to adapt to RF communications transmitted between at least two disparate communication networks.

Consistent with certain embodiments, the present disclosure is directed to circuit arrangements which permit an RF receiver to sniff different/disparate RF communications schemes such as those used in power-line communications networks. In more specific non-limiting example embodiments, such circuit arrangements includes RF front-end circuitry and RF back-end circuitry. The RF front-end circuitry receives sets of RF signals concurrently as the RF signals are transmitted from different disparate communication networks. The RF back-end circuitry includes high-speed logic circuitry that unpacks the data from the concurrently-received RF signals. The front-end circuitry can include a tunable radio including at least one antenna feeding signal conditioning and down conversion circuitry and decimation circuitry coupled to the tunable radio. The decimation circuitry filters and decimates data associated with the RF signals into a plurality of digital data streams. The RF back-end circuitry includes a plurality of digital-signal processors (DSPs) that extract raw data packets from the plurality of digital data streams and a microprocessor coupled to the decimation circuitry. The microprocessor transmits the plurality of digital data streams to the plurality of DSPs and transmits the extracted raw data packets, received from the plurality of DSPs, to an end-user device.

The decimation circuit can decimate data corresponding to the RF signals, and, in response, output data in a plurality of at least sixteen data streams including I and Q data streams. For example, the decimation circuit can decimate the data into sixteen narrower band digital data streams. The microprocessor transmits two of the sixteen narrower band digital data streams to each of the plurality of DSPs, in some specific embodiments. And, the plurality of DSPs extract raw data packets from the two digital data streams, although embodiments are not so limited. In various embodiments, the RF front-end circuitry receives RF communications over at least thirty-two channels or sixty-four channels, and the communications apparatus includes multiple DSPs. In other embodiments, the RF front-end circuitry receives RF communications over at least sixteen channels, and the communications apparatus includes multiple DSPs. The communications apparatus can include a remote storage device coupled to the DPS that stores the extracted raw data packets.

The communications apparatus can include various additional circuitry, in a number of embodiments. For example, the communications apparatus can include a global positioning system (GPS) transceiver coupled to the microprocessor. The microprocessor can associate GPS coordinates, from the GPS transceiver, with extracted raw data packets. Other embodiments can further include the end-user device and/or other external circuitry. The end-user device and/or other external circuitry can generate a report using the extracted raw data packets. Additionally, the end-user device and/or other external circuitry can be used to set parameters for the system, such as RF frequency, bandwidth of streams, modulation, and/or baud rate.

As a specific example, a communications apparatus including the plurality of DSPs can extract raw data packets from the plurality of digital data streams by decimating one of the plurality of digital data streams received from the microprocessor into two narrower bandwidth digital data streams via a first one of the plurality of DSPs; decimating the two data streams received from the first one of the plurality of DSPs into four narrower bandwidth digital data streams via a second one of the plurality of DSPs; and decimating the four data streams received from the second one of the plurality of DSPs into eight narrower bandwidth digital data streams via a third one of the plurality of DSPs. The communications apparatus can further perform the extraction by extracting raw data packets from a first two of the eight data streams received from the third one of the plurality of DSPs via a fourth one of the plurality of DSPs; extracting raw data packets from a second two of the eight data streams received from the third one of the plurality of DSPs via a fifth one of the plurality of DSPs; extracting raw data packets from a third two of the eight data streams received from the third one of the plurality of DSPs via a sixth one of the plurality of DSPs; and extracting raw data packets from a fourth two of the eight data streams received from the third one of the plurality of DSPs via a seventh one of the plurality of DSPs. Although embodiments are not so limited.

Other particular embodiments involve a communications apparatus that includes the RF front-end circuitry and RF back-end circuitry. The RF front-end circuit and RF back-end circuitry can be coupled via a communications interface. The RF front-end circuitry includes at least one antenna feeding signal conditioning and down conversion circuitry and decimation circuitry. In specific embodiments, the RF front-end circuitry can include a tunable radio coupled to the decimation circuitry, such as a tunable radio having one or more antennas that provide the RF signals to the at least one antenna feeding signal conditioning and down conversion circuitry. The RF front-end circuitry can receive sets of RF signals concurrently as the RF signals are transmitted from disparate communication networks across a wide frequency band. In specific embodiments, the tunable radio has a plurality of antennas optimized for reception of RF signals from the disparate communication networks. The decimation circuitry filters and decimates data associated with the RF signals into a plurality of digital data streams and in response, outputs data in a plurality of digital data streams. For example, the decimation circuit outputs the data in at least sixteen digital data streams including I and Q data streams. The RF back-end circuitry includes DSPs and at least one microprocessor. The DSPs decode discernible data in at least two of the plurality of digital data streams. The microprocessor transmits data streams from the plurality of digital data streams to the DSPs and transmits decoded discernible data to circuitry external thereto.

The communications apparatus can further include the circuitry, which may form part of an end-user device. The circuitry generates a report which identifies at least one set of decoded RF signals received from among the disparate communication networks using the transmitted decoded discernible data. The circuitry and/or end-user device can reconfigure the decimation circuitry and the RF back-end circuitry, wherein during operation of the communications apparatus, at least one of the decimation circuitry and the RF back-end circuit is optimized for receiving and decoding the RF signals received from the disparate communication networks.

A number of embodiments are directed to methods of using the above-described communications apparatus. An example method includes receiving, via a RF front-end circuitry, sets of RF signals concurrently as the RF signals are transmitted from at least two disparate communication networks across a wide frequency band. The method further involves filtering and decimating, via decimation circuitry of the RF front-end circuitry, data associated with the RF signals into a plurality of digital data streams and in response, outputting data in the plurality of digital data streams by: transmitting the data streams from the RF front-end circuitry to RF back-end circuitry; decoding, via decimation circuitry of the RF back-end circuit, discernible data in at least two of the plurality of digital data streams; and transmitting decoded discernible data to circuitry of an end-user device.

In various embodiments, the method further includes generating, by the circuitry of the end-user device, a report which identifies at least one set of decoded RF signals received from among the disparate communication networks using the transmitted decoded discernible data. Alternatively and/or in addition, the method can further include reconfiguring at least one of the decimation circuitry and the RF back-end circuitry to optimize, during operation, the at least one of the decimation circuitry and the RF back-end circuit for receiving and decoding the RF signals received from the disparate communication networks.

These and other aspects of the present disclosure are exemplified in a number of illustrated implementations and applications, some of which are shown in the figures and characterized in the claims section that follows. The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
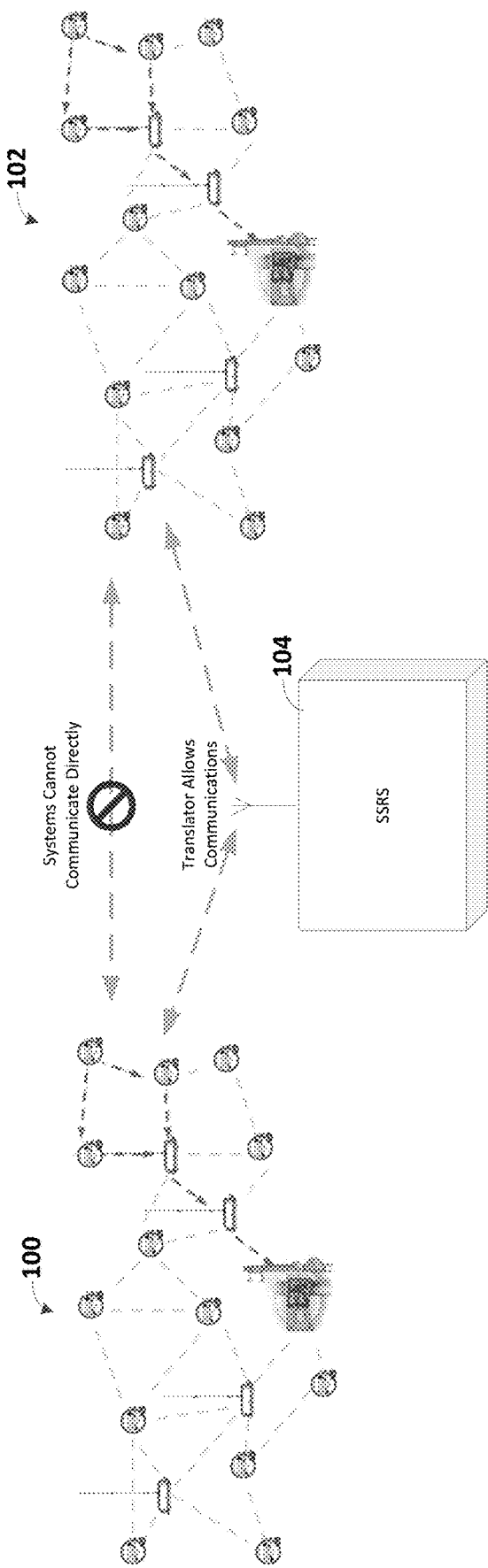
FIG. 1 is a system diagram of a system-sniffing receiver system (SSRS), consistent with various embodiments of the present disclosure.

While the disclosure is amenable to various modifications and alternative forms, examples thereof have been shown by way of example in the drawings and are described in detail herein. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those involving radio configurability for adapting to radio frequency systems. Various aspects are directed to a communications apparatus having a front-end circuitry that concurrently receives sets of radio frequency signals transmitted from different disparate communication networks and back-end high-speed logic circuitry that unpacks the data from the concurrently-received radio frequency signals. While the present disclosure is not necessarily limited to such applications, various aspects of the disclosure may be appreciated through a discussion of various examples using these contexts.

Different radio frequency (RF) environments involve RF communications over channels that are noisy and/or crowded. Example environments can involve RF signals from multiple disparate RF communications systems, such as cellular and local-area RF networks which commonly transmit data within overlapping frequency ranges using a multitude of modulation schemes and cause crowding and/or noise. It can be beneficial to have an RF tool that assists with installation and maintenance of the RF networks by understanding mapping of the RF signal strengths and mesh formation of the RF networks. Embodiments in accordance with the present disclosure are directed to a communications apparatus that acts as a sniffer of all channels, modulation schemes, and standards using the RF networks. The communications apparatus can include a software defined radio (SDR) used as the sniffer in the RF network and that is capable of being used as various components in an RF mesh system, which can field translate various protocols, and, in some more-specific embodiments, which can be used to receive power line communication (PLC) transmissions.

According to certain aspects of the present disclosure, a system-sniffing receiver system (SSRS) receives analog radio frequency (RF) signals broadcast on a wide spectrum of frequencies and converts the analog RF signals to a plurality of digital data streams, each within a portion of the wide spectrum. The SSRS can further extract raw data packets from the plurality of data streams. The SSRS can include a communications apparatus having an RF front-end that delivers I and Q data streams from a band of selected frequencies and an RF back-end that hands data communications between devices and decodes the channels. The RF front-end, in specific embodiments, includes decimation circuitry that filters and decimates the data. The communications apparatus allows for a flexible system that can be modified to receive data from a variety of frequency ranges (e.g., 70 megahertz (MHz) to 6 gigahertz (GHz)) by changing code in the RF back-end (e.g., microprocessors). By modifying code, any frequency, any modulation scheme, and any existing or future physical standard can be received by the communications apparatus and/or within the system as a whole. Additionally, multiple channels can be received simultaneously without the use of multiple tunable radios (e.g., 64 channels of frequency-shift keying (FSK) and/or 32 channels of orthogonal frequency-division multiplexing (OFDM) simultaneously). Because of the wide frequency range and flexibility, one device can be used on systems all over the world.

Various embodiments include a communications apparatus that permits an RF receiver to sniff different/disparate RF communications schemes. The communications apparatus includes RF front-end circuitry and RF back-end circuitry. The RF front-end circuitry receives sets of RF signals concurrently as the RF signals are transmitted from different disparate communication networks. The RF back-end circuitry includes high-speed logic circuitry that unpacks the data from the concurrently-received RF signals. The front-end circuitry can include a tunable radio including at least one antenna feeding signal conditioning and down conversion circuitry and decimation circuitry coupled to the tunable radio. The decimation circuitry filters and decimates data associated with the RF signals into a plurality of digital data streams. The RF back-end circuitry includes a plurality of digital-signal processors (DSPs) to extract raw data packets from the plurality of digital data streams and a microprocessor coupled to the decimation circuitry. The microprocessor transmits the plurality of digital data streams to the plurality of DSPs and transmits the extracted raw data packets, received from the plurality of DSPs, to an end-user device.

For RF data reception, the code can be partitioned between components of the RF back-end circuitry, such as the microprocessor(s) and the DSPs. Some communications apparatus designs rely on a microprocessor or DSP exclusively to receive the channel. Embodiments in accordance with the present disclosure allow for an end-user device to move more or less processing from microprocessor(s) to DSPs, and DSPs to microprocessor(s). Additionally, the communications apparatus can be used to substitute for many RF mesh components, such as gateways (e.g., collectors), routers, multi-channel repeaters, and other components. For example, the communications apparatus can be used as other smart grid devices in a power system such as power quality monitors, transformer monitors and other metrology related systems. The apparatus allows for translation of protocols for retransmission and/or reception to and from different RF and other systems. In accordance with various embodiments, the decimation circuit decimates data corresponding to the RF signals, and, in response, outputs data in a plurality of at least sixteen data streams including I and Q data streams. As a specific example, the decimation circuit decimates the data into sixteen narrower band (e.g. narrower than received wide frequency band). The microprocessor transmits at least some, such as two of the sixteen narrower band digital data streams to each of the plurality of DSPs, in some specific embodiments. The plurality of DSPs can also extract raw data packets from the two digital data streams, although embodiments are not so limited. The RF front-end circuitry can receive RF communications over at least thirty-two channels or sixty-four channels, and the communications apparatus includes multiple DSPs. In other embodiments, the RF front-end circuitry receives RF communications over at least sixteen channels, and the communications apparatus includes multiple DSPs.

The communications apparatus can include various additional circuitry, in a number of embodiments. For example, the communications apparatus can include a global positioning system (GPS) transceiver coupled to the microprocessor. The microprocessor can associate GPS coordinates, from the GPS transceiver, with extracted raw data packets. Other embodiments can further include the end-user device and/or other external circuitry. The end-user device and/or other external circuitry can generate a report using the extracted raw data packets, such as a report that identifies at least one set of decoded RF signals received from among the disparate communications networks using the transmitted decoded discernible data. The report can be indicative of discovered modulation and/or the baud rate associated with each of the data streams, corresponding signal strength, specific geographic locations along with corresponding signal strength, channel noise/interference associated with channels, and mesh formation of the RF network(s), among other information. Additionally, the end-user device and/or other external circuitry can be used to set parameters for the system, such as RF frequency, bandwidth of streams, modulation, and/or baud rate.

Other particular embodiments involve a communications apparatus that includes the RF front-end circuitry and RF back-end circuitry. The RF front-end circuit and RF back-end circuitry can be coupled via a communications interface. The RF front-end circuitry includes at least one antenna feeding signal conditioning and down conversion circuitry and decimation circuitry. As previously described, the RF front-end circuitry can include a tunable radio coupled to the decimation circuitry, such as a tunable radio having one or more antennas that provide the RF signals to the at least one antenna signal conditioning and down conversion circuitry. The RF front-end circuitry receives sets of RF signals concurrently as the RF signals are transmitted from disparate communication networks across a wide frequency band. In specific embodiments, the RF front-end circuitry (e.g., the tunable radio) has a plurality of antennas optimized for reception of RF signals from the disparate communication networks. The decimation circuitry filters and decimates data associated with the RF signals into a plurality of digital data streams and in response, outputs data in a plurality of digital data streams. For example, the decimation circuit outputs the data in at least sixteen digital data streams including I and Q data streams. The RF back-end circuitry includes DSPs and at least one microprocessor. The DSPs decode discernible data in at least two of the plurality of digital data streams. The microprocessor transmits data streams from the plurality of digital data streams to the DSPs and transmits decoded discernible data to circuitry external thereto.

The communications apparatus can further include the (external) circuitry, which may form part of an end-user device. The circuitry generates a report which identifies at least one set of decoded RF signals received from among the disparate communication networks using the transmitted decoded discernible data. The circuitry and/or end-user device can reconfigure the decimation circuitry and the RF back-end circuitry, wherein during operation of the communications apparatus, at least one of the decimation circuitry and the RF back-end circuit is optimized for receiving and decoding the RF signals received from the disparate communication networks.

A number of embodiments are directed to methods of using the above-described communications apparatus. An example method includes receiving, via a RF front-end circuitry, sets of RF signals concurrently as the RF signals are transmitted from at least two disparate communication networks across a wide frequency band. The method further involves filtering and decimating, via decimation circuitry of the RF front-end circuitry, data associated with the RF signals into a plurality of digital data streams and in response, outputting data in the plurality of digital data streams by: transmitting the data streams from the RF front-end circuitry to RF back-end circuitry; decoding, via decimation circuitry of the RF back-end circuit, discernible data in at least two of the plurality of digital data streams; and transmitting decoded discernible data to circuitry of an end-user device. The method further includes generating, by the circuitry of the end-user device, a report which identifies at least one set of decoded RF signals received from among the disparate communication networks using the transmitted decoded discernible data. Alternatively and/or in addition, the method can further include reconfiguring at least one of the decimation circuitry and the RF back-end circuitry to optimize, during operation, the at least one of the decimation circuitry and the RF back-end circuit for receiving and decoding the RF signals received from the disparate communication networks.

Figure 2:
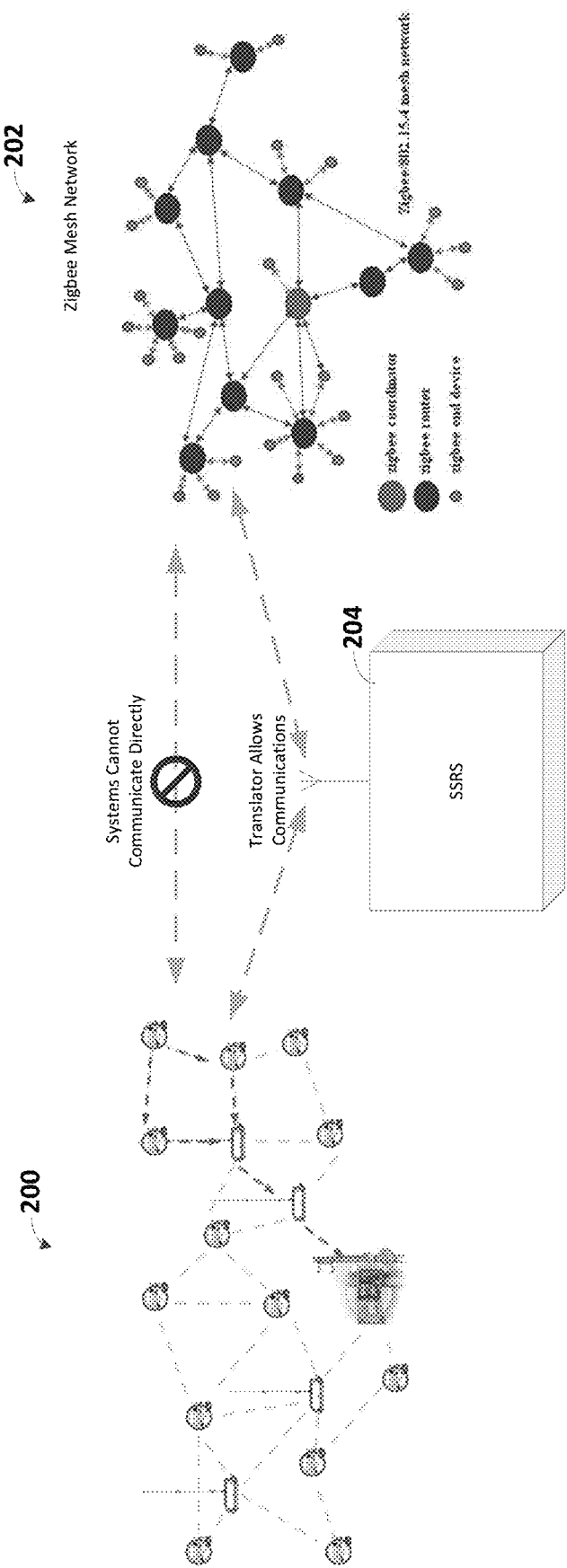
FIG. 2 is a system diagram of an SSRS, consistent with various embodiments of the present disclosure.

Turning now to the figures, FIGS. 1 and 2 are system diagrams each using a SSRS, consistent with example embodiments of the present disclosure, and each illustrating exemplary applications including but not limited to translating protocols of disparate RF systems and discerning (or "sniffing") active RF protocols. In each of FIGS. 1 and 2, two disparate communication networks are illustrated. FIG. 1 shows a first RF system 100 and a second RF system 102. The first RF system 100 communicates data using a first modulation scheme while the second RF system 102 communicates data using a second modulation scheme disparate from the first modulation scheme. Consequently, the first RF system 100 cannot directly communicate with the second RF system 102 (the second RF system 102 cannot directly receive data from the first RF system 100) and vice versa. The SSRS 104 can include a communications apparatus that translates data received from one RF system (e.g., the first RF system 100) such that the data can be used by another RF system (e.g., the second RF system 102).

Similarly, FIG. 2 illustrates two disparate communication networks, including a first RF system 200 and a second RF system 202, with this second system being an ad hoc network that uses a modulation scheme disparate from that used by the second RF system 202. For example, the second RF system 202 can be based on a ZigBee mesh network communications scheme. An SSRS 204, analogous to the SSRS 104 illustrated in FIG. 1, translates data received from one RF system (e.g., the first RF system 200) such that the data can be used by another RF system (e.g., the second RF system 202) or for collection and storage involving another system and analysis.

Figure 3:
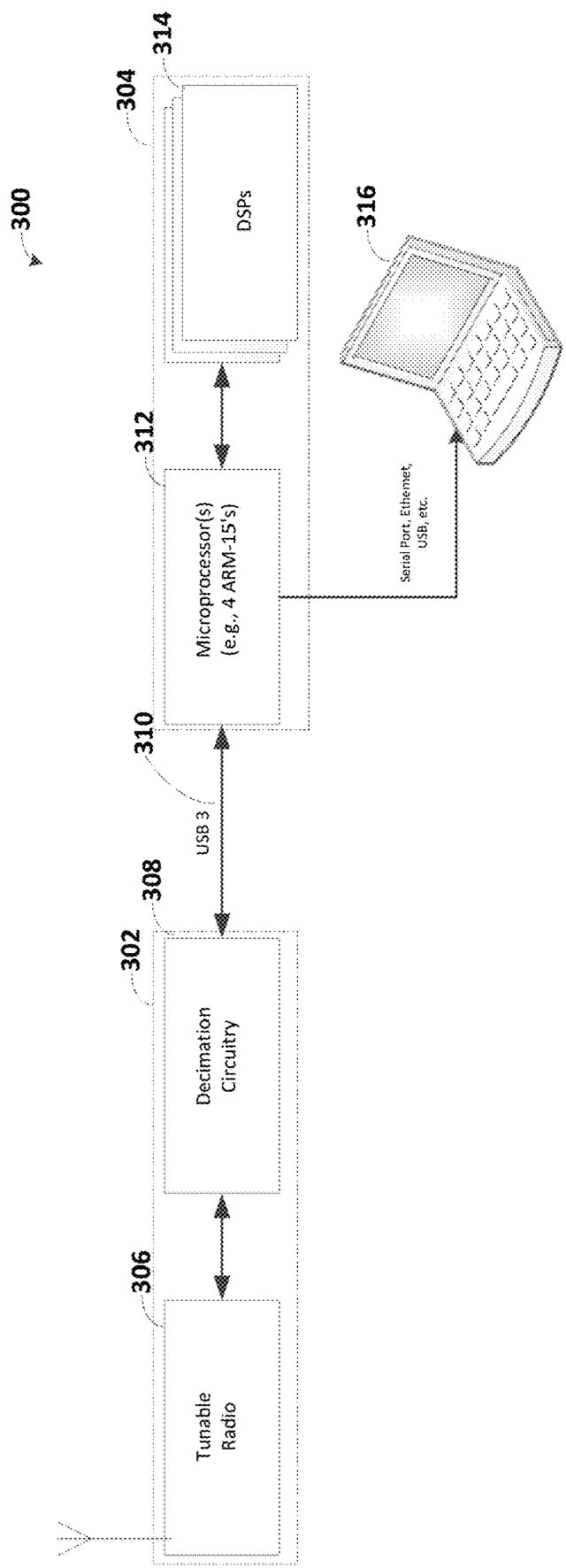
FIG. 3 is a block diagram illustrating an example of a communications apparatus, consistent with various embodiments of the present disclosure.

FIG. 3 is a block diagram illustrating an example of a communications apparatus, consistent with various embodiments of the present disclosure. The communications apparatus 300 can include or form part of an SSRS, as previously described in connection with FIGS. 1-2. As with the SSRS 104 illustrated in FIG. 1, the communications apparatus 300 includes RF front-end circuitry 302 and RF back-end circuitry 304.

The RF front-end circuitry 302 can connect to disparate communication networks, such as RF network(s), PLC network(s) and/or devices that have parameters to be measured. Additional, the RF front-end circuitry 302 has settable parameters, such as gain, center frequency, sample rate, and other settings. In some embodiments, multiple RF front-end circuitries can be used to multiple-input and multiple-output (MIMO) applications, beam-steering, and/or signal direction finding.

In various embodiments, the RF front-end circuitry 302 concurrently receives sets of RF signals transmitted from disparate communication networks across a wide frequency band. The RF front-end circuitry 302 can include a tunable radio 306 having at least one antenna. In various specific embodiments, the tunable radio 306 has multiple antennas for optimizing reception from the different RF networks. The tunable radio 306 can include signal conditioning and down conversion circuitry which can be fed by the antenna. The tunable radio 306 can include analog-to-digital (A/D) converters. The RF front-end circuitry 302 can additionally include decimation circuitry 308 coupled to the tunable radio 306. In various specific embodiments, the decimation circuitry 308 includes a field programmable gate array (FPGA). The decimation circuitry 308 filters and decimates data corresponding to RF signals received by the tunable radio 306. For example, the tunable radio 306 can input sets of RF signals to the decimation circuitry 308 at 25.6 mega samples per second (Msps), although the embodiments are not so limited. The decimation circuitry 308 can decimate the RF signals from one data stream (at 25.6 Msps) to sixteen data streams (each at 1.6 Msps), although the embodiments are not so limited. As used herein, "sample" refers to or includes a complex sample including one floating point I reading and one floating point Q reading from a RF signal. The decimation circuitry 308 can include a FPGA with direct digital synthesis (DDS), a filter, and/or a complex mixer.

The RF front-end circuitry 302 can be coupled to the RF back-end circuitry 304 via a communications interface and/or protocol 310, such as universal serial bus (USB) 3.0. The RF back-end circuitry 304 can comprise or include digital-signal processing circuitry. As illustrated in FIG. 3, the RF back-end circuitry 304 includes microprocessor(s) 312 and digital signal processors (DSPs) 314. The DSPs 314 can be connected to a common bus for inter-DSP communications and to transmit data between the DSPs 314 and the microprocessor(s) 312. In at least one embodiment, the microprocessor(s) 312 can include Advanced Reduced Instruction Set Computing (RISC) Machines (e.g., ARMs such as ARM-15). The microprocessor(s) 312 can read the data streams from the communications interface and/or protocol 310 (e.g., sixteen data streams) and send at least two of the data streams to each of the DSPs 314, in some specific embodiments.

As may be appreciated, DSPs can perform various signal processing. Example signal processing includes demodulating RF and/or PLC complex I/Q signals received from the RF front-end circuitry 302 and/or creating modulation signals, based on packets transmitted from the microprocessor(s) 312, which are sent to the RF front-end circuitry 302 as complex I/Q data. As discussed further below in connection with FIGS. 4 and 5, the DSPs 314 can run receiver algorithms using the appropriate settings associated with the data stream received by a particular one of the DSPs 314 to extract raw data packets from the data stream. The settings can include, but are not limited to, modulation, baud rate, and channel spacing associated with the data stream received by a particular one of the DSPs 314. The DSPs 314 send the extracted raw data packets to the microprocessor(s) 312, which in turn can send the raw extracted data packets off system to another circuit for processing as depicted at end-user device 316 or terminal. Although not illustrated in FIG. 3, the DSPs 314 can be coupled to a non-volatile storage device (or memory circuit) where the extracted raw data packets can be stored for analysis at a later time, for example, by an offsite CPU system which may have more processing capabilities.

The terminal or end-user device 316 can be physically or wireless coupled to the microprocessor(s) 312, for example, via a serial port, Ethernet, and/or USB. The end-user device 316 can include a display, memory for recording the raw extracted data packets from the microprocessor(s) 312, and a high level packet decoder. In a number of embodiments, the end-user device 316 is a laptop computer, which may be used by a technician in the field. The end-user device 316 can be used to set the parameters used by the communications apparatus 300 such as RF, bandwidth (sample rate) of the data streams from the tunable radio 306 and/or the decimation circuitry 308, modulation, and/or baud rate. The communications apparatus 300 can automatically discover the modulation and/or the baud rate associated with each of the data streams.

In a number of specific embodiments, the end-user device 316 and/or circuitry associated with the end-user device 316 (or other external circuitry) can be used to generate a report that identifies at least one set of decoded RF signals received from among the disparate communications networks using the transmitted decoded discernible data. The report can be indicative of discovered modulation and/or the baud rate associated with each of the data streams, corresponding signal strength, specific geographic locations along with corresponding signal strength, channel noise/interference associated with channels, and mesh formation of the RF network(s), among other information. Additionally and/or alternatively, the end-user device 316 and/or circuitry associated with the end-user device 316 (or other external circuitry) can reconfigure at least one of the decimation circuitry 308 and the RF back-end circuitry 304 (e.g., the microprocessor(s) 312 and/or DSPs 314 to optimize, during operation of the communications apparatus 300, the at least one of the decimation circuitry 308 and the RF back-end circuitry 304 for receiving and decoding the RF signals received from the disparate communication networks. For example, the reconfiguration can include moving more or less processing from the microprocessor(s) 312 to the DSPs 314, and/or from the DSPs 314 to the microprocessor(s) 312.

Figure 4:
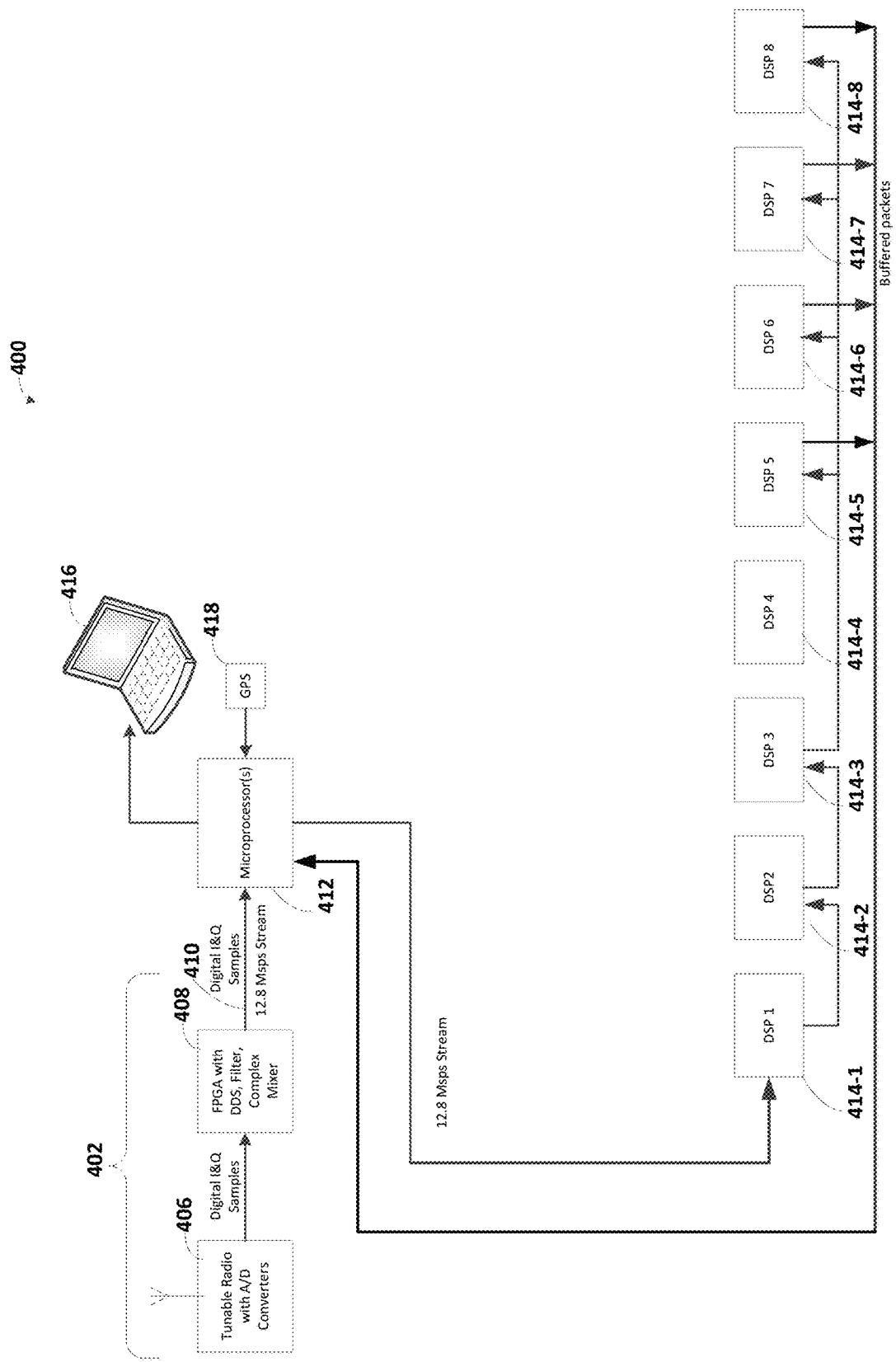
FIG. 4 is a block diagram illustrating another example of a communications apparatus, consistent with various embodiments of the present disclosure.

FIG. 4 is a block diagram illustrating another, more-specific communications apparatus, as is consistent with various embodiments of the present disclosure. The communications apparatus 400 is specifically configured for processing up to thirty-two channels using an exemplary arrangement of digital-signal-processing circuits for analyzing data streams received by the tunable radio 406 at high speeds. The RF front-end circuitry 402, tunable radio 406, decimation circuitry 408, communications interface and/or protocol 410, microprocessor(s) 412, DSPs 414-1, 414-2, 414-3, 414-4, 414-5, 414-6, 414-7, 414-8, and end-user device 416, at a general level, operate similar to the RF front-end circuitry 302, tunable radio 306, decimation circuitry 308, communications interface and/or protocol 310, microprocessor(s) 312, DSPs 314, and end-user device 316 illustrated in FIG. 3.

As illustrated in the example of FIG. 4, the microprocessor(s) 412 transmit a single, e.g., 12.8 Msps, data stream to a first DSP 414-1 (DSP 1). DSP 1 decimates the 12.8 Msps data stream into two 6.4 Msps data streams and transmits the two data streams to a second DSP 414-2 (DSP 2). DSP 2 decimates the two 6.4 Msps data streams into four 3.2 Msps data streams and transmits the four data streams to a third DSP 414-3 (DSP 3). DSP 3 decimates the four 3.2 Msps data streams into eight 1.6 Msps data streams and transmits two of the eight data streams to each of a fifth DSP 414-5 (DSP 5), a sixth DSP 414-6 (DSP 6), a seventh DSP 414-7 (DSP 7), and an eighth DSP 414-8 (DSP 8). DSPs 5-8 extract (discover) raw data packets in the two received streams and places them in a buffer. The buffered data packets are transmitted to the microprocessor(s) 412. Each data stream, as used in this particular example and in accordance with many embodiments, can include or otherwise contain four channels.

Although a fourth DSP 414-4 (DSP 4) may be unused in the example of FIG. 4, DSP 4 can, for example, perform metrics and/or perform fast Fourier transform (FFT) spectrum(s) on one or more of the data streams. The communications apparatus 400 can include a global positioning system (GPS) transceiver 418 coupled to the microprocessor(s) 412 to provide GPS coordinates associated with the data streams. In accordance with various embodiments, communications apparatuses can allow for demodulation of 50 kilobits per second (kbps) and 100 kbps FSK signals, and can be used in a variety of bands, such as those consistent with United States and European bands. Additionally, a single channel Long Range (LoRA) transmitter receiver can be used.

Figure 5:
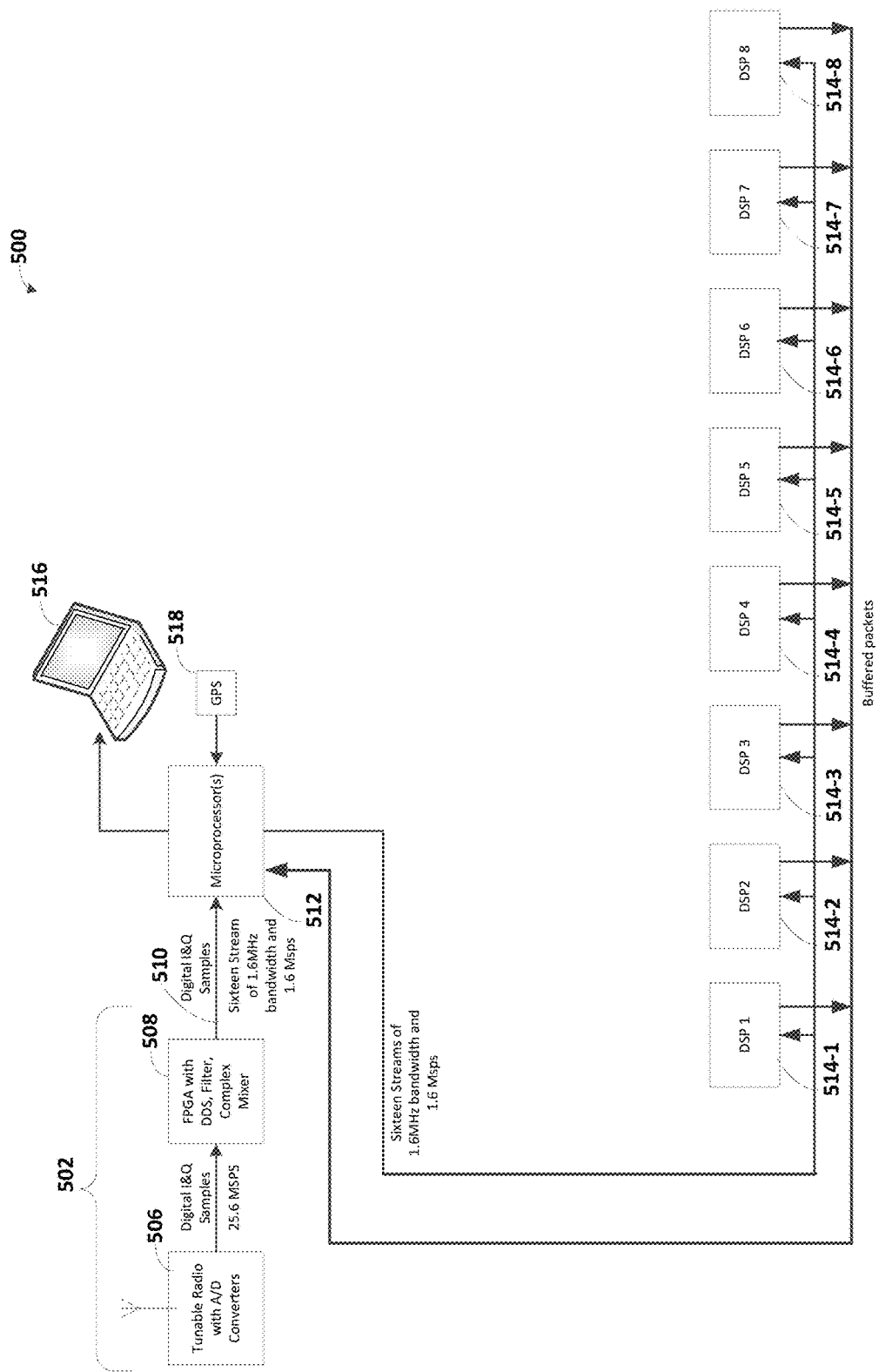
FIG. 5 is a block diagram illustrating another example of a communications apparatus, consistent with various embodiments of the present disclosure.

FIG. 5 is a block diagram illustrating another example of a communications apparatus, consistent with various embodiments of the present disclosure. The communications apparatus 500 is configured for processing sixty-four channels using an exemplary arrangement of digital-signal-processing circuits for analyzing data streams received by the radio at high speeds. The RF front-end circuitry 502, tunable radio 506, decimation circuitry 508, communications interface and/or protocol 510, microprocessor(s) 512, DSPs 514-1, 514-2, 514-3, 514-4, 514-5, 514-6, 514-7, 514-8, and end-user device 516 can operate similar to the RF front-end circuitry 302, tunable radio 306, decimation circuitry 308, communications interface and/or protocol 310, microprocessor(s) 312, DSPs 314, and end-user device 316 illustrated in FIG. 3.

As illustrated in FIG. 5, the tunable radio 506 transmits data to the decimation circuitry 508, via the communications interface and/or protocol 510, at 25.6 Msps. The decimation circuitry 508 decimates the 25.6 Msps data stream into sixteen 1.6 Msps data streams of 1.6 MHz bandwidth. Each of the DSPs 514-1 to 514-8 (DSPs 1-8) receive two of the sixteen 1.6 Msps data streams from the microprocessor(s) 512 and extracts (discovers) raw data packets in the received data streams. The extracted raw data packets are placed in a buffer of each of DSPs 1-8. The buffered data packets are transmitted to the microprocessor(s) 512. The communications apparatus 500 can include a GPS transceiver 518 coupled to the microprocessor(s) 512 to provide GPS coordinates associated with the data streams.

While 32-channel and 64-channel implementations are illustrated, other n-channel implementations are possible such as 16-channel and 8-channel implementations. If the number of channels is smaller, the number of DSP's can be reduced. For example, if an 8-channel FSK (frequency-shift-key) system is used, a single DSP can be used. Additionally, if a 16-channel FSK system is used, two DSPs can be used, among other examples.

Figure 6:
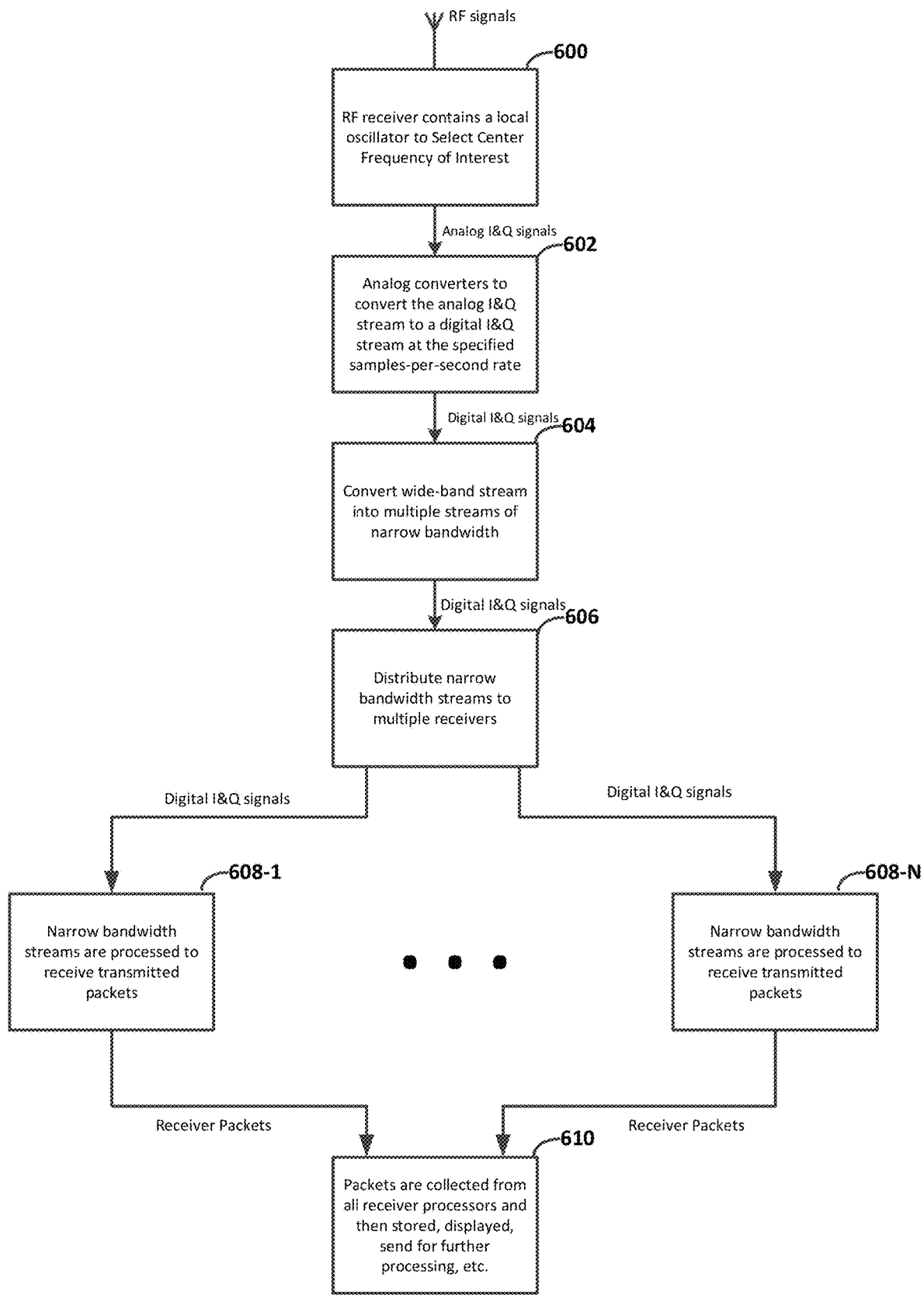
FIG. 6 is a flow chart illustrating an example of uses of communications apparatus, consistent with various embodiments of the present disclosure.

FIG. 6 is a flow chart illustrating an example of uses of communications apparatuses depicted in the previously described figures, consistent with example embodiments of the present disclosure. At block 600, RF signals are received by an RF receiver (e.g., tunable radio 306 illustrated in FIG. 3). The RF receiver can include a local oscillator to select a center frequency. At block 602, A/D converters (e.g., of the tunable radio 306) convert received analog I and Q signals into a digital I and Q data stream at a predetermined rate. At block 604, the wide-band digital I and Q data stream is converted (e.g., decimated by the decimation circuitry 308) into multiple digital I and Q data streams of narrower bandwidth than the wide-band digital I and Q data stream. At block 606, the multiple digital I and Q data streams are distributed (e.g., by the microprocessor(s) 312) to multiple (N) processors (e.g., the DSPs 314). At blocks 608-1 to 608-N (N refers to a quantity of the processors), at least one of the multiple digital I and Q data streams are processed by the N processors to receive transmitted packets. At block 610, the received packets are collected from the processors, stored, displayed (e.g., at the end-user device 316) and/or transmitted for further processing.

Figure 7:
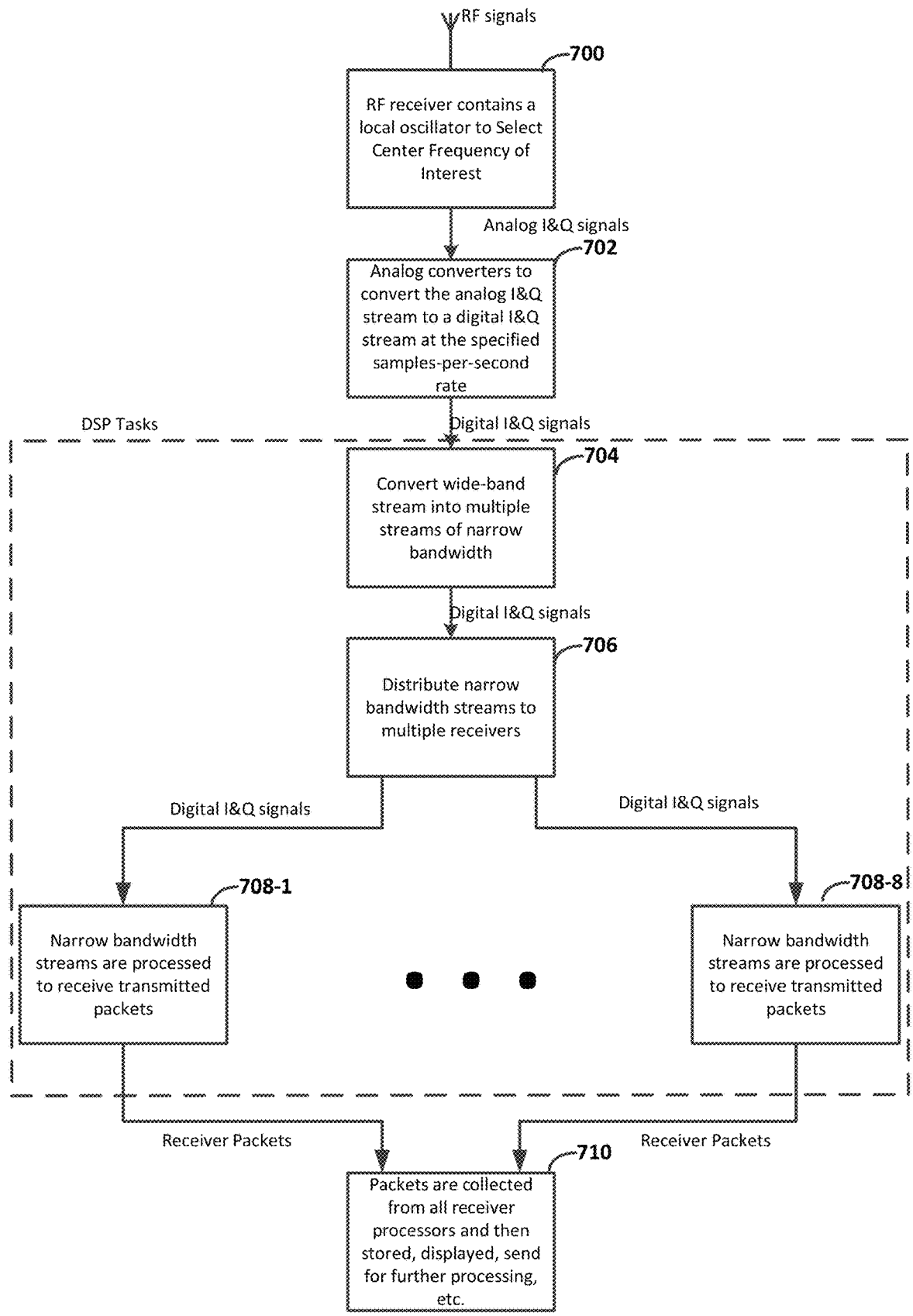
FIG. 7 is a flow chart shows an example of use of the communications apparatus depicted in FIG. 4, consistent with various embodiments of the present disclosure.

FIG. 7 is a flow chart shows an example use of the communications apparatus depicted in FIG. 4, consistent with example embodiments of the present disclosure. As may be appreciated, FIG. 7 is consistent with the more-general embodiments illustrated by FIG. 6. At block 700, RF signals are received by an RF receiver (e.g., tunable radio 406). The RF receiver includes a local oscillator to select a center frequency. At block 702, A/D converters (e.g., of the tunable radio 406) convert received analog I and Q signals into a digital I and Q data stream at a predetermined rate. At block 704, the wide-band digital I and Q data stream is converted (e.g., decimated by DSPs 414-1 to 414-3) into eight digital I and Q data streams of narrower bandwidth than the wide-band digital I and Q data stream. At block 706, the eight digital I and Q data streams are distributed to other processors (e.g., DSPs 414-5 to 414-8). At blocks 708-1 to 708-8, the eight digital I and Q data streams are processed to receive transmitted packets. In the example of FIG. 7, the dashed box denotes tasks performed by the processors. At block 710, the received packets are collected from the processors, stored, displayed (e.g., at the end-user device 316) and/or transmitted for further processing.

Figure 8:
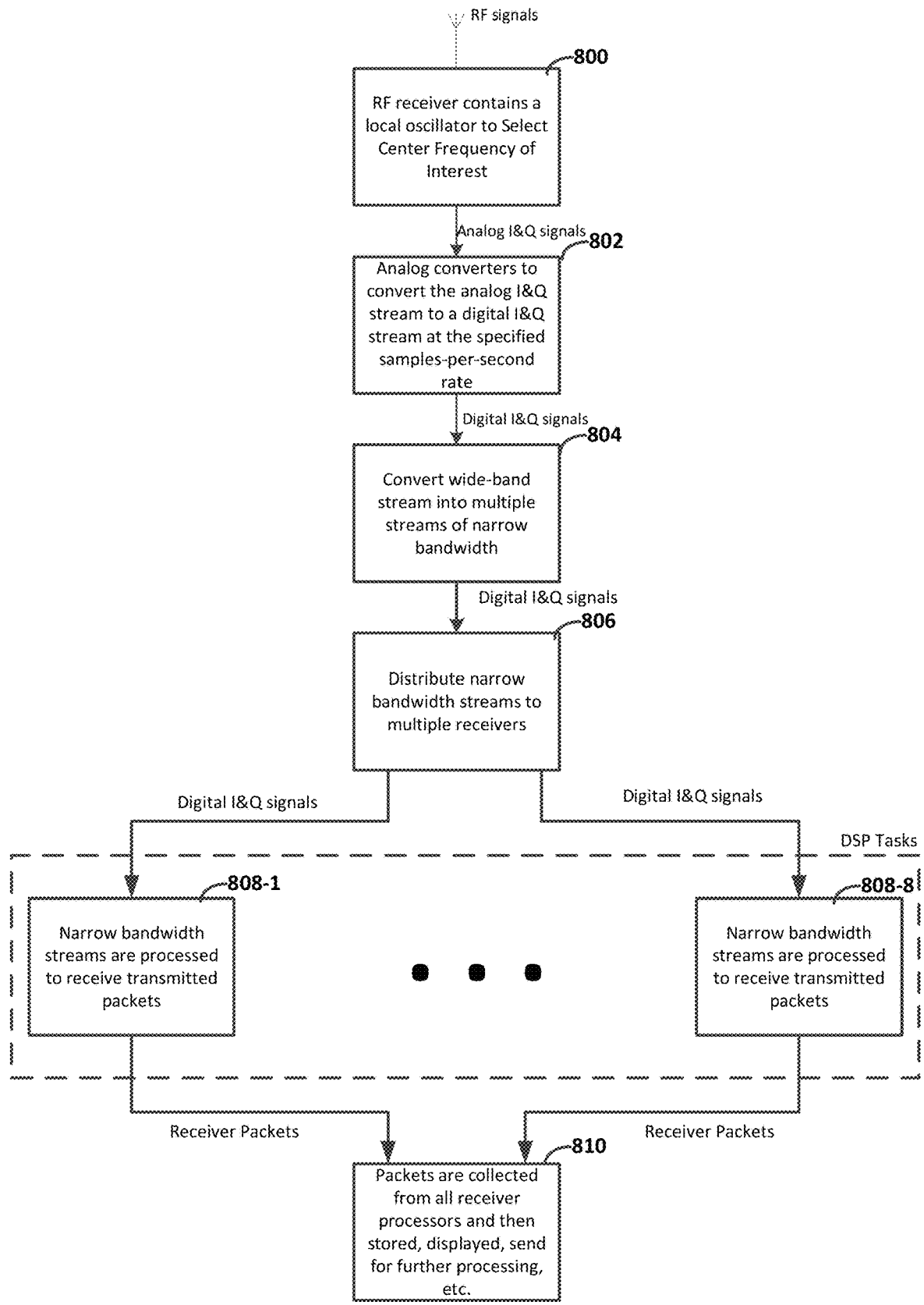
FIG. 8 is a flow chart shows an example of use of the communications apparatus depicted in FIG. 5, consistent with various embodiments of the present disclosure.

FIG. 8 is a flow chart shows an example use of the communications apparatus depicted in FIG. 5, consistent with the present disclosure. FIG. 8, as may be appreciated, is also consistent with the more-general embodiments illustrated by FIG. 6. At block 800, RF signals are received by a RF receiver (tunable radio 506). The RF receiver includes a local oscillator to select a center frequency. At block 802, A/D converters (e.g., of the tunable radio 506) convert received analog I and Q signals into a digital I and Q data stream at a predetermined rate. At block 804, the wide-band digital I and Q data stream is converted (e.g., decimated by the decimation circuitry 508) into sixteen digital I and Q data streams of narrower bandwidth than the wide-band digital I and Q data stream. At block 806, the two digital I and Q data streams are distributed (e.g., by the microprocessor(s) 512) to each of eight processors (e.g., the DSPs 514). At blocks 808-1 to 808-8, two of the sixteen digital I and Q data streams are processed by the processors to receive transmitted packets. In the example of FIG. 8, the dashed box denotes tasks performed by the processors (covering a different set of such tasks relative to the example shown in FIG. 6). At block 810, the received packets are collected from the processors, stored, displayed (e.g., at the end-user device 516) and/or transmitted for further processing.

Figure 9:
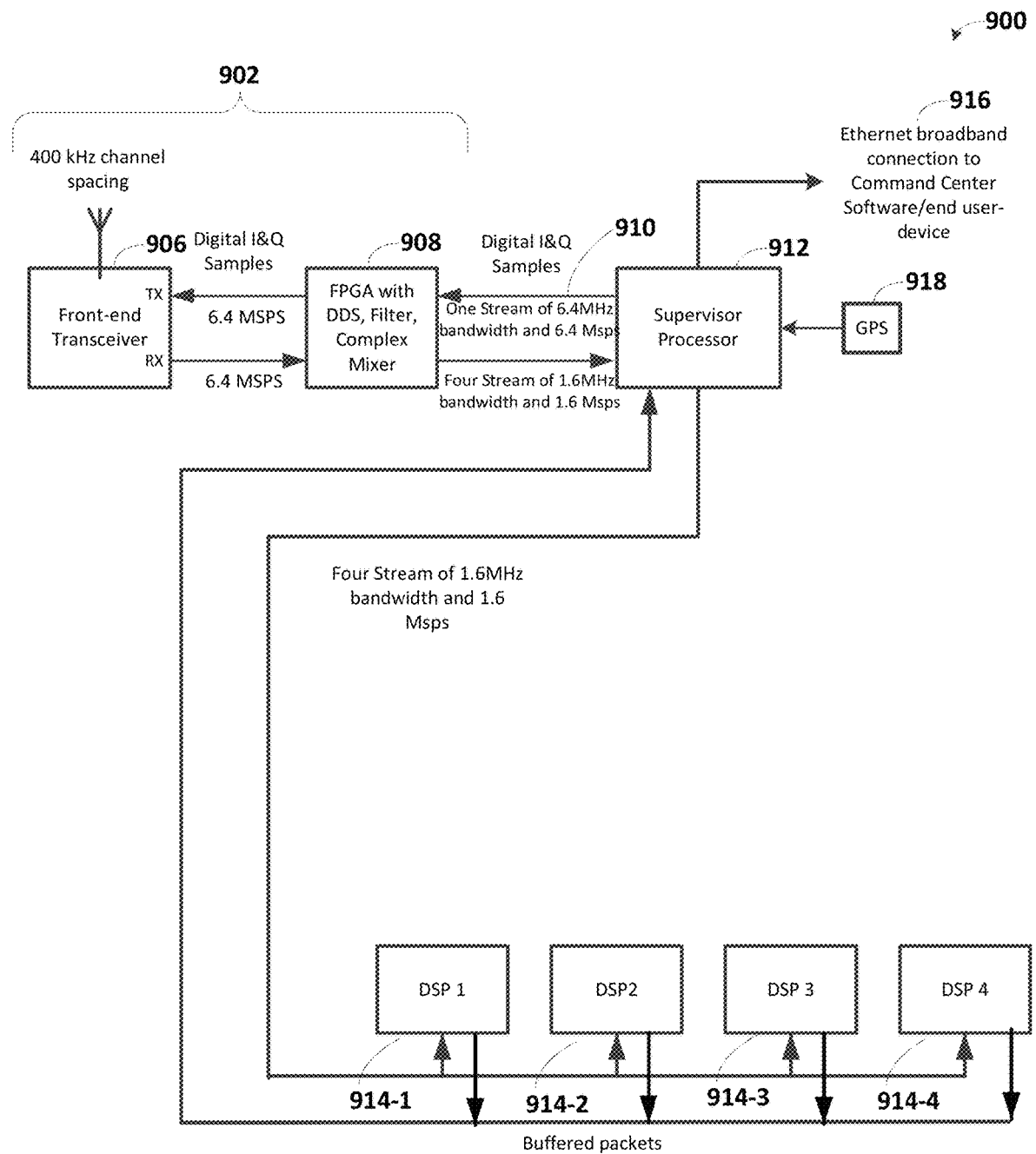
FIG. 9 is a block diagram illustrating another of a communications apparatus, consistent with various embodiments of the present disclosure.

FIG. 9 is a block diagram illustrating another example of a communications apparatus, consistent with example embodiments of the present disclosure. The communications apparatus 900 is specifically configured for processing up to sixteen channels using an exemplary arrangement of digital-signal-processing circuits for analyzing data streams received by the radio at high speeds. The RF front-end circuitry 902, tunable radio 906, decimation circuitry 908, communications interface and/or protocol 910, microprocessor(s) 912, DSPs 914-1, 914-2, 914-3, 914-4, and end-user device 916, at a general level, operate similar to the RF front-end circuitry 302, tunable radio 306, decimation circuitry 308, communications interface and/or protocol 310, microprocessor(s) 312, DSPs 314, and end-user device 316 illustrated in FIG. 3.

As illustrated in FIG. 9, the tunable radio 906 transmits data to the decimation circuitry 908, via the communications interface and/or protocol 910, at 6.4 Msps, in some specific embodiments. The decimation circuitry 908 decimates the 6.4 Msps data stream into four 1.6 Msps data streams of 1.6 MHz bandwidth. The first DSP 914-1 and second DSP 914-2 (DSPs 1-2) each receive two of the four 1.6 Msps data streams from the microprocessor(s) 912 and extract (discovers) raw data packets in the received data streams. The third DSP 914-3 and fourth DSP 914-4 create modulated signals via a stream containing up to sixteen channels in this example (e.g., outgoing as complex I/Q data samples with 6.4 Msps data rate). The extracted raw data packets are placed in a buffer of each of DSPs 1-4. For example, the third DSP 914-3 and fourth DSP 914-4 can sum sixteen different packets (e.g., as I/Q data) together and can place the same into the buffer. The buffered data packets are transmitted to the microprocessor(s) 912 from one of the DSPs 1-4. The communications apparatus 900 can include a GPS transceiver 918 can be coupled to the microprocessor(s) 912 to provide GPS coordinates associated with the data streams.

There are various applications of the above-described circuit and associated operations and architecture. Each such implementation uses the circuit and associated operations of the SSRS-type is an embodiment having its own application-specific benefits. Examples include implementation of the SSRS as a field sniffer to view RF traffic and/or map signal strengths (e.g., a GPS receiver could be attached to the ARM-15's as in FIGS. 3-4 to log/track/report geographic locations along with corresponding signal strength), and as a router in a wireless mesh (ad hoc or other style) communications network in which there is a strongly-integrated interconnectivity between similarly-operating devices (e.g., SSRS). When used as a router, such an SSRS acts essentially in a data-repeating operation with each repeat transmission giving better signal strength and with better physical positioning than another comparable/similarly-situated device (such as a PLC endpoint device), and also gives the ability to reroute to a different channel, such as in the presence of noise/interference.

According to certain implementations and applications presented in connection with the present disclosure, substantial benefit has been found from use of SSRS in such data communication environments. Accordingly, for specific example applications, the present disclosure describes an SSRS that can concurrently receive RF signals from disparate communication networks and extract raw data packets from the RF signals such that the extracted data packets can be analyzed locally in the field or remotely. It should be appreciated, however, that not all aspects of the present disclosure are necessarily limited to such systems and communication environments. Certain embodiments of the present disclosure are directed to an SSRS for receiving and unpacking data sent via RF from endpoint devices (e.g., power meters and/or relay stations) and/or collectors, while such devices are conveying information (e.g., power meter reports and/or control signals) over a multitude of communication channels.

As another example, the SSRS can be used as a gateway (collector, concentrator, takeout point) that receives endpoint packets in the mesh network and sends the endpoint packets to a home office via any of various network types. Example network types include cellular, optical fiber, Ethernet, secondary radio, etc. When used as a gateway, the SSRS is capable of conveying RF signals with information from the home office to various endpoints.

Further, the SSRS-type device can be used as a translator to allow one system to receive, and transmit to, another system. For example, assume a customer has an earlier generation of RF mesh, that is incompatible with a new system, and is installing the new generation system. A SSRS-type device (e.g., a software defined radio (SDR) translator) can translate (repackage, re-form) one systems packets to the others so the systems can interoperate to at least some degree. Such SSRS-type device can also translate, back-and-forth, from one system to a competitors system (e.g., while in a Landis+Gyr mesh-type PLC network to/from a network located in Silver Springs, or to/from ZigBee endpoint devices). While implemented as a translator, the SSRS-type device can also translate, back-and-forth, from a power-line-carrier (PLC) to and RF system (Landis+Gyr mesh to/from Landis+Gyr PLX PLC).

Various embodiments are implemented in accordance with the underlying Provisional Application (Ser. No. 62/560,522), entitled "Apparatuses and Methods with Radio Configurable for Adapting to a RF Systems" filed on Sep. 19, 2017 and including the attached Appendix, to which benefit is claimed and which are fully incorporated herein by reference. For instance, embodiments herein and/or in the provisional application, including the Appendix, may be combined in varying degrees including wholly combined. As an example, the embodiments herein can be combined and/or include the subject matter involving PLC systems/methods with location-extendable collection as described in the Appendix. Reference may also be made to the experimental teachings and underlying references provided in the underlying provisional application. Embodiments discussed in the Appendix are not intended, in any way, to be limiting to the overall technical disclosure, or to any part of the claimed invention unless specifically noted.

Also, for related discussion and aspects of data transfer and processing over such PLC mediums, reference may be made to U.S. Pat. Nos. 8,737,555 and 9,525,462. The subject matter and aspects disclosed in in the above-noted US Letters Patents, are incorporated by reference in their entirety generally for the purposes explained above and specifically for combining related aspects including modifying the above-illustrated SSRSs for communications with (e.g., in a wireless communications arrangement within and remote from the subcollectors/collectors disclosed therein. As an example adaptation, a transformer device (current transformer or line-voltage transformer connected to an analog-to-digital circuit) can be added as an alternative communication channel for receiving power line carrier (L+G TS2 or PLX, G3 PLC, IEEE 1901.2 PLC, etc.), and the SSRSs can be situated as part of the above-characterized collectors (internal or location-extendible). This same effect, for PLC-dedicated operations, can be realized by changing out the above-described RF front-end circuitry (e.g., FIGS. 3-5) to a transformer device for receiving power line carrier.

Unless otherwise indicated, various generally-depicted programmable integrated circuits such as processors and/or logic circuitry may be used with programs in accordance with the teachings herein, and/or for certain applications it may prove convenient to construct a more specialized apparatus to perform the required actions. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. As another example, it will be appreciated that the term communication devices refers to and/or includes circuits enabled to communicate to other devices, for example over the illustrated broadband network, such as WiFi, (RF-based) local area networks, and/or cellular enabled devices such as smart thermostats, smart water heaters and the like. For example, WiFi/cellular enabled devices may include a desktop CPU, tablet, smart phone, etc. Accordingly, the various components and processes shown in the figures (including those discussed and illustrated in connection with the Appendix of the underlying provisional application) can be implemented in a variety of circuit-based forms, such as through the use of data processing circuits (operative by circuit components alone or in combination with configuration/software data, otherwise known as "blocks" or "modules").

It is recognized that aspects of the present disclosure can be practiced with computer/processor-based system configurations other than those expressly described herein (including the Appendix). The required structure for a variety of these systems and circuits would be apparent from the application and the above description. Further, it is appreciated that various terms used in the instant disclosure are known to those skilled in the art to describe aspects relating to one or more of circuits to implement certain circuit-based logic, data communications and related protocols, applications and the like. Such techniques include the description of computation for signal processing expressed in terms of an algorithm or mathematical expression, such as Fast-Fourier Transform (FFT). While such techniques may be implemented, for example, by executing code on a computer, the expression of that technique may be conveyed and communicated as a formula, algorithm, or mathematical expression. For the purposes of this document, each of the terms endpoint, endpoint device and communication device refers to and/or includes circuits enabled to communicate, for example over the described communication network, whether PLC, WiFi, Internet, cellular enabled, etc. As just one example, a WiFi/cellular-enabled communication device (e.g., endpoint or modem device) may include a microcomputer, memory for executing a computer program, a programmable logic array and/or data-communication driver circuitry as is common in variety of known circuits including desktop CPUs, tablets, smart phones, and communications equipment commercially available from the instant assignee, Landis+Gyr Technologies, LLC (operating in Minnesota and elsewhere).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on particular circuits and/or software code to implement one or more of the various modules. Such modifications and changes do not depart from the true spirit and scope of the present disclosure, including aspects set forth in the following claims.

What is claimed is:

1. A communications apparatus, comprising:
   radio frequency (RF) front-end circuitry configured and arranged to receive sets of RF signals concurrently as the RF signals are transmitted from at least two disparate communication networks across a wide frequency band, the RF front-end circuitry including:
      a tunable radio including at least one antenna feeding signal conditioning and down conversion circuitry; and
      decimation circuitry coupled to the tunable radio, the decimation circuitry configured and arranged to filter and decimate data associated with the RF signals into a plurality of digital data streams; and
   RF back-end circuitry including:
      a plurality of digital-signal processors (DSPs) configured and arranged to extract raw data packets from the plurality of digital data streams;
      a microprocessor coupled to the decimation circuitry, the microprocessor configured and arranged to:
         transmit the plurality of digital data streams to the plurality of DSPs; and
transmit the extracted raw data packets, received from the plurality of DSPs, to an end-user device.

2. The communications apparatus of claim 1, wherein the decimation circuitry is configured and arranged to decimate the data corresponding to the RF signals and in response, output data in a plurality of at least sixteen digital data streams including I and Q data streams.

3. The communications apparatus of claim 1, wherein:
   the decimation circuitry is configured and arranged to decimate data associated with the RF signals by decimating the data into sixteen narrower band digital data streams,
   the microprocessor is configured and arranged to transmit two of the sixteen narrower band digital data streams to each of the plurality of DSPs; and
   the plurality of DSPs are configured and arranged to extract raw data packets from the two digital data streams.

4. The communications apparatus of claim 1, further comprising a remote storage device coupled to the plurality of DSPs and configured and arranged to store the extracted raw data packets.

5. The communications apparatus of claim 1, further comprising a global positioning system (GPS) transceiver coupled to the microprocessor, and wherein the microprocessor is further configured and arranged to associate GPS coordinates with the extracted raw data packets.

6. The communications apparatus of claim 1, further including the end-user device configured and arranged to generate a report using the extracted raw data packets.

7. The communications apparatus of claim 1, wherein the end-user device is configured and arranged to set parameters for the communications apparatus including parameters selected from the group consisting of: RF frequency, bandwidth of streams, modulation, baud rate, and combinations thereof.

8. The communications apparatus of claim 1, wherein the RF front-end circuitry is configured and arranged to receive RF communications over at least thirty-two channels, and the communications apparatus includes multiple DSPs.

9. The communications apparatus of claim 1, wherein the RF front-end circuitry is configured and arranged to receive RF communications over at least sixty-four channels, and the communications apparatus includes multiple DSPs.

10. The communications apparatus of claim 1, wherein the RF front-end circuitry is configured and arranged to receive RF communications over at least sixteen channels, and the communications apparatus includes multiple DSPs.

11. The communications apparatus of claim 1, wherein the plurality of DSPs are configured and arranged to extract raw data packets from the plurality of digital data streams by:
   decimating one of the plurality of digital data streams received from the microprocessor into two narrower bandwidth digital data streams via a first one of the plurality of DSPs;
   decimating the two data streams received from the first one of the plurality of DSPs into four narrower bandwidth digital data streams via a second one of the plurality of DSPs;
   decimating the four data streams received from the second one of the plurality of DSPs into eight narrower bandwidth digital data streams via a third one of the plurality of DSPs;
   extracting raw data packets from a first two of the eight data streams received from the third one of the plurality of DSPs via a fourth one of the plurality of DSPs;
   extracting raw data packets from a second two of the eight data streams received from the third one of the plurality of DSPs via a fifth one of the plurality of DSPs;
   extracting raw data packets from a third two of the eight data streams received from the third one of the plurality of DSPs via a sixth one of the plurality of DSPs; and
   extracting raw data packets from a fourth two of the eight data streams received from the third one of the plurality of DSPs via a seventh one of the plurality of DSPs.

12. A communications apparatus, comprising:
   radio frequency (RF) front-end circuitry including at least one antenna feeding signal conditioning and down conversion circuitry and including decimation circuitry, the RF front-end circuitry configured and arranged to receive sets of RF signals concurrently as the RF signals are transmitted from disparate communication networks across a wide frequency band, decimation circuitry configured and arranged to filter and decimate data associated with the RF signals into a plurality of digital data streams and in response, to output data in a plurality of digital data streams;

RF back-end circuitry including:
digital-signal processors (DSPs) configured and arranged to decode discernible data in at least two of the plurality of digital data streams; and
microprocessor configured and arranged to transmit data streams from the plurality of digital data streams to the DSPs and to transmit decoded discernible data to circuitry; and
the circuitry configured and arranged to generate a report which identifies at least one set of decoded RF signals received from among the disparate communication networks using the transmitted decoded discernible data.

13. The communications apparatus of claim 12, wherein the circuitry is part of an end-user device configured and arranged to reconfigure the decimation circuitry and the RF back-end circuitry, wherein during operation of the communications apparatus, at least one of the decimation circuitry and the RF back-end circuit is optimized for receiving and decoding the RF signals received from the disparate communication networks.

14. The communications apparatus of claim 12, wherein the decimation circuitry is configured and arranged to output the data in at least sixteen digital data streams including I and Q data streams.

15. The communications apparatus of claim 12, wherein the RF front-end circuitry includes a tunable radio coupled to the decimation circuitry, the tunable radio having a plurality of antennas that are optimized for reception of RF signals from the disparate communication networks and that provide the RF signals to the at least one antenna feeding signal conditioning and down conversion circuitry.

16. The communications apparatus of claim 12, wherein the decimation circuitry includes a field programmable gate array (FPGA).

17. The communications apparatus of claim 12, further including a communications interface that couples the RF front-end circuitry to the RF back-end circuitry.

18. A method comprising:
receiving, via a radio frequency (RF) front-end circuitry, sets of RF signals concurrently as the RF signals are transmitted from at least two disparate communication networks across a wide frequency band; and
filtering and decimating, via decimation circuitry of the RF front-end circuitry, data associated with the RF signals into a plurality of digital data streams and in response, outputting data in the plurality of digital data streams by:
transmitting the digital data streams from the RF front-end circuitry to a microprocessor in a RF back-end circuitry;
transmitting, by the microprocessor, the digital data streams to decimation circuitry of the RF back-end circuitry;
decoding, via the decimation circuitry of the RF back-end circuitry, discernible data in at least two of the plurality of digital data streams; and
transmitting, by the microprocessor, decoded discernible data from the decimation circuitry of the RF back-end circuitry to circuitry of an end-user device.

19. The method of claim 18, further including generating, by the circuitry of the end-user device, a report which identifies at least one set of decoded RF signals received from among the disparate communication networks using the transmitted decoded discernible data.

20. The method of claim 18, further including reconfiguring at least one of the decimation circuitry of the RF front-end circuitry and the RF back-end circuitry to optimize, during operation, the at least one of the decimation circuitry of the RF front-end circuitry and the RF back-end circuitry for receiving and decoding the RF signals received from the disparate communication networks.

* * * * *